June 7, 1932. H. C. LORD 1,862,483
AUTOMOBILE ENGINE MOUNTING
Filed June 23, 1930
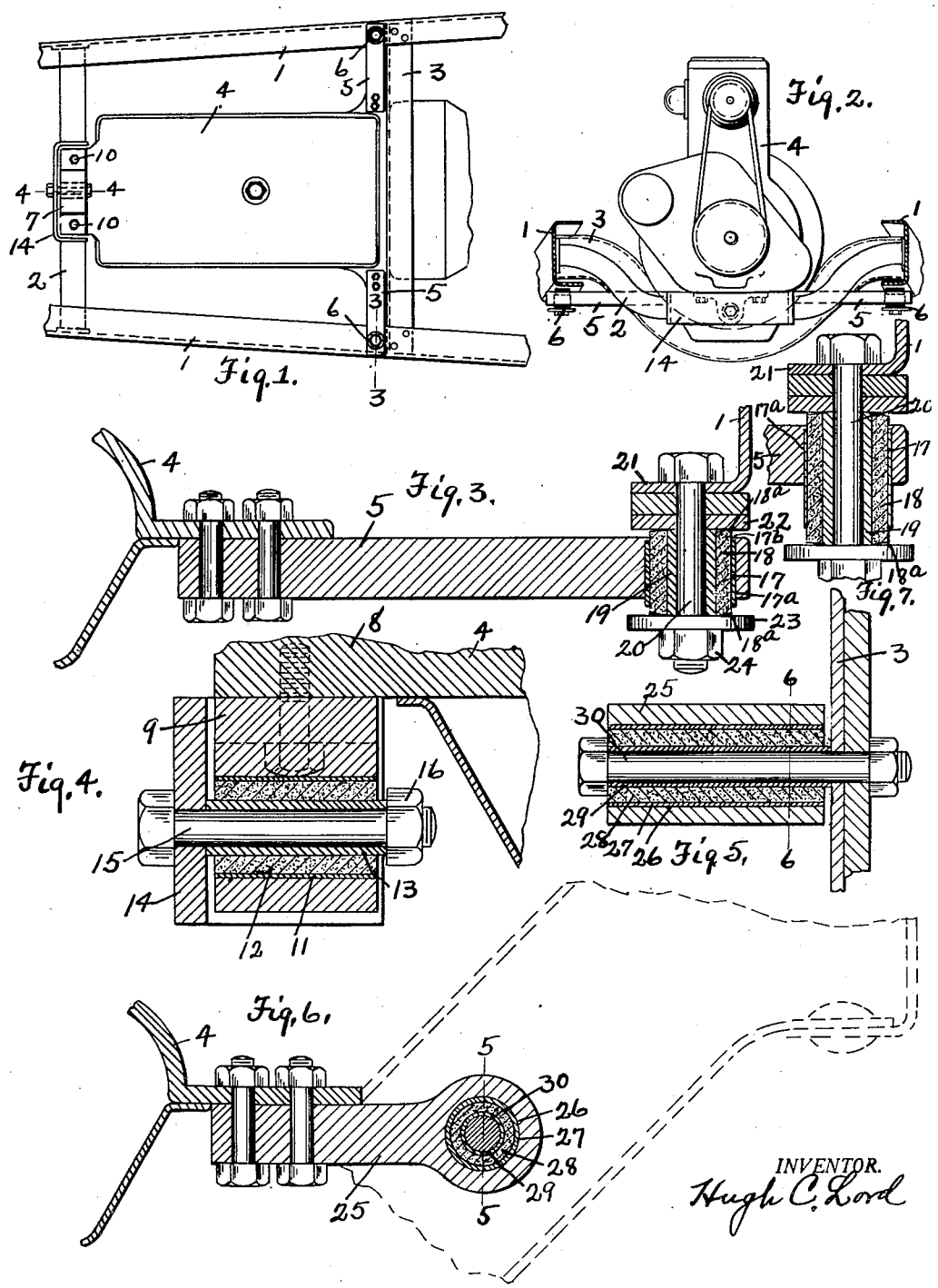
INVENTOR.
Hugh C. Lord Patented June 7, 1932

1,862,483

UNITED STATES PATENT OFFICE

HUGH C. LORD, OF ERIE, PENNSYLVANIA

AUTOMOBILE ENGINE MOUNTING

Application filed June 23, 1930. Serial No. 463,067.

This invention is directed to mountings for automobile engines, which mountings are designed to absorb the vibration of the engine and minimize the transmission of such vibrations to the automobile frame, or body. In carrying out the invention I support the engine entirely on rubber mountings both fore and aft. Preferably all of these mountings are under tension and also preferably at least some of said mountings are under tension and shear, rubber under tension having a greater vibration absorption quality than rubber under compression and also answering the requirement to some extent at least for giving stability to the motor, and rubber in shear affording a much more sensitive response to vibration than rubber subjected to direct stress, as compression or tension. An added sensitiveness is given where the rubber is both under tension and shear and in the preferred form of this invention at least some of the mountings are so arranged. Features and details of the invention will appear from the specification and claims.

A preferred embodiment of the invention is illustrated in the accompanying drawing as follows:

Fig. 1 shows a bottom view of the engine with its mounting.

Fig. 2 a front elevation of the engine and its mounting.

Fig. 3 an enlarged view of one of the supporting arms of the engine in section on the line 3—3 in Fig. 1.

Fig. 4 an enlarged section of the front of the engine mounting in section on the line 4—4 in Fig. 1.

Fig. 5 a section on the line 5—5 in Fig. 6 showing a modification.

Fig. 6 a section on the line 6—6 in Fig. 5.

Fig. 7 a vertical section of a variation in the mounting.

1 marks the side frames of the engine, 2 the front cross member, 3 a cross member at the rear of the engine, 4 the engine, 5 the side arms at the rear of the engine, 6 mountings at the ends of the side supports and 7 a front mounting for the engine. The front mounting is secured to an extension 8 on the engine. It is carried in a block 9 secured to the engine by screws 10. The block has a fore and aft cylindrical opening through it and a shell 11 has a pressed fit in this opening. A rubber bushing 12 is arranged in the shell and a sleeve 13 within the rubber bushing. The sleeve 13 protrudes slightly from the rubber bushing and is supported by a U-shaped bracket 14 secured in and forming part of the front cross member 2. A bolt 15 extends through the bracket 14 and the sleeve 13 and is clamped in place by a nut 16. The rear mountings have outer shells 17 in which is arranged a rubber bushing 18 and within which there is an inner sleeve 19. The shell 17 is pressed into an opening 17a in the supporting arm and engages a shoulder 17b at the top of the arm. A bolt 20 extends through a flange 21 of the side member 1 through a washer 22 on top of the sleeve 19 and the sleeve 19 and washer 23 and these parts are clamped together by a nut 24 at the bottom of the bolt.

The rubber in each of these mountings is bonded to the metal sleeve and shell during the process of vulcanization of the rubber. As the rubber cools after vulcanization it shrinks and places this rubber under very definite tension. The front mounting is of sufficient size relatively to the weight of the engine to carry the entire weight of the engine on the tension side of the mounting, that is to say, the sleeve 13 is not offset sufficiently to neutralize the tension on the compression side. As to the rear mountings they are placed with their axes in a vertical direction so that the rubber of these mountings is not only in tension, but also in shear which gives to these mountings the greatest possible stability with the greatest possible sensitiveness for absorption of incipient vibrations.

The front mounting having its axis extending from front to rear responds to torque vibrations with the rubber in shear between the outer and inner members of the mounting and the rear mountings being substantially tangential to the torque center respond to the torque vibrations in shear so that substantially the entire torque vibrations of the engine are accommodated and in the present exemplification taken by the rubber in shear.

This gives to the mounting great sensitiveness and vibration absorption quality so far as the torque impulses of the engine are concerned and at the same time is particularly efficient by reason of the tension and shear relations in taking care of unbalanced conditions and vibrations operating in connection with the gravity thrust. The rear mountings, it will be noted, carry the greater portion of the engine load. The extensions to the rear of the cylinder, as shown in the drawing, where the mountings are attached add considerable weight. This manner of mounting also gives a three-point suspension. One of the mountings being annular, or having arcuate surfaces with an axis fore and aft permits the easy rocking of the engine under torque thrusts. On the other hand, the separated vertical mountings at the sides take the torque thrusts in shear, but can be so placed relatively to the distance from the torque-inducing axis and so proportioned as to resist a greater movement of the engine than is desirable. Thus a response to vibratory thrusts may be taken with as great, or little movement of the engine as all things considered may be desirable, it being, of course, understood that with a freer movement under normal conditions less of the vibratory thrust is transferred to the frame. I prefer to make the three-point suspension with the single mounting in front, but it will be understood that this arrangement may be varied and I prefer to use but the single mounting at the end having the one-point suspension. It will be understood that it is preferable that the one-point suspension be accomplished by a single unit but this may be varied, the essential feature being that the support be so localized as in effect to give the one-point support.

It often happens that the thrust on the mounting on one side of the engine either from the torque of the engine, or distribution of the weight of the engine is greater than the opposite side. Under these conditions, it is desirable to make the mounting at the side having the greatest thrust stiffer and this is accomplished in the structure shown in Fig. 7. In this mounting the rubber bushing, shell and sleeve are longer so that a greater amount of rubber is interposed to sustain the load.

As an alternative structure the rear supports may be supplied with horizontal mountings similar to the horizontal mounting in front. To this end the arms 25 have the cylindrical bores 26 fore and aft in which there is placed a mounting having an outer shell 27, a rubber bushing 28 and sleeve 29. The sleeve 29 is clamped to the cross member 3 by a bolt 30 which extends through the sleeve and cross member. This mounting is formed as the other mountings are by bonding the rubber during vulcanization to the shell and sleeve and is so proportioned as to carry the engine load on the tension side of the rubber so that the weight of the engine is carried by the rubber in tension.

The engine 2 is an internal combustion engine and as illustrated the entire support of the connection between the frame and the engine is through the rubber mounting. It will be noted that the ends of the bushings 18, as illustrated in Figs. 3 and 7 are barely in contact, or possibly slightly out of contact toward their outer peripheries at 18a with the washers 22 and 23. Thus there is given a very limited free vibration movement without material obstruction from these ends, but with any undue movement beyond the incipient periodic vibrations, these ends quickly snub the movement as the rubber is compressed between the outer shell and the washers.

What I claim as new is:—

1. In an automobile engine mounting, the combination of an automobile frame, an engine, and rubber mounting units for the engine having portions secured to the engine and to the frame and forming the only supporting connection therebetween, at least one of the mountings comprising opposing walls extending in a vertical direction and having rubber secured to the opposed faces thereof so as to carry a portion of the motor weight through a shear stress of the rubber.

2. In an automobile engine mounting, the combination of an automobile frame, an engine, and rubber mountings for the engine having portions secured to the engine and the frame and forming the only supporting connection therebetween, at least one of said mountings being so constructed and arranged as to carry a portion of the motor weight through a shear stress of the rubber.

3. In an automobile engine mounting, the combination of an automobile frame, an engine, and rubber mountings for the engine having portions secured to the engine and the frame and forming substantially the only supporting connection therebetween, at least one of the mountings having the rubber bonded to one of said members and disposed in thrust-resisting relation to the other member, said mounting including a body of rubber projecting from the member to which the rubber is bonded and so disposed as to receive a vibratory thrust of the engine through shear of the rubber.

4. In an automobile engine mounting, the combination of an automobile frame, an engine, and rubber mountings for the engine having portions secured to the engine and the frame and forming substantially the only supporting connection therebetween, at least one of the mountings having the rubber bonded to one of said members and disposed in thrust-resisting relation to the other member, said mounting including a body of rubber projecting from the member to which the rubber is bonded and so disposed as to carry a portion of the engine weight through shear stress of the rubber.

5. The combination of means mounting a member having rotating parts subjecting the member to a torque-induced vibration; a supporting member for the vibrating member, said member having attaching parts; and rubber cushioning means forming substantially the only support for the vibrating member and disposed between the attaching parts and secured with relation to one member at least by bonding, the rubber means being so disposed that the major portion of the torque thrust taken by the rubber is taken by rubber accommodating the torque thrust in shear.

6. The combination of means mounting a member having rotating parts subjecting the member to torque-induced vibration; a supporting member for the vibrating member, said members having attaching parts; and rubber cushioning means forming substantially the only support for the vibrating member and disposed between the attaching parts and secured with relation to one member at least by bonding, the rubber means being so disposed that a portion of the torque thrust taken by the rubber is taken by rubber accommodating the torque thrust in shear and a portion of the gravity thrust on the rubber is accommodated by a different stress of the rubber.

7. The combination of means mounting a member having rotating parts subjecting the member to torque-induced vibration; a supporting member for the vibrating member, said members having attaching parts; and rubber cushioning means forming substantially the only support for the vibrating member and disposed between the attaching parts and secured with relation to one member at least by bonding, the rubber means being so disposed that a major portion of the torque and gravity thrust is taken by rubber in shear and a portion of the gravity thrust is accommodated by a different stress of the rubber.

8. The combination of means mounting a member having rotating parts subjecting the member to torque-induced vibrations; a supporting member for the vibrating member, said members having attaching parts at the ends of said vibrating member; and rubber cushioning means disposed between the attaching parts and secured with relation to one member at least by bonding, the rubber being so disposed between the parts that the major portion of the torque thrust taken by the rubber is taken by rubber accommodating the torque movement in shear.

9. The combination of means mounting a member having rotating parts subjecting the member to torque-induced vibrations; a supporting member for the vibrating member, said members having attaching parts at the ends of said vibrating member; and rubber cushioning means disposed between the attaching parts and secured with relation to one member at least by bonding, the rubber being so disposed between the parts that the major portion of the torque thrust at each end of the member is taken by rubber accommodating the torque movement in shear.

10. The combination of means mounting a member having rotating parts subjecting the member to torque-induced vibrations; a supporting member for the vibrating member, said members having attaching parts at the ends of said vibrating member; and rubber cushioning means disposed between the attaching parts and secured with relation to one member at least by bonding, the rubber being so disposed between the parts that the major portion of the torque and gravity thrusts are taken by the rubber in shear.

11. The combination of means mounting a member having rotating parts subjecting the member to torque-induced vibrations; a supporting member for the vibrating member, said members having attaching parts at the ends of said vibrating member; and rubbber cushioning means disposed between the attaching parts and secured with relation to one member at least by bonding, the rubber being so disposed between the parts that the major portion of the torque thrust taken by the rubber at each end of the member is taken by rubber accommodating the torque movement in shear, the major portion of the gravity thrust at one end of the engine being taken by the rubber in shear and the major portion of the gravity thrust at the opposite end of the engine is accommodated by a different stress of the rubber than the shear stress accommodating the torque.

12. The combination of means mounting a member having rotating parts subjecting the member to torque-induced vibrations; a supporting member for the vibrating member, said members having attaching parts at the ends of said vibrating member; and rubber cushioning means disposed between the attaching parts and secured with relation to one member at least by bonding, the rubber being so disposed between the parts that the major portion of the thrust taken by the rubber is taken by rubber accommodating the torque movement in shear, and the gravity thrust at one end of the vibrating member is accommodated by a different stress on the rubber than that which accommodates the torque thrust in shear.

13. The combination of means mounting a member having rotating parts subjecting the member to torque-induced vibrations; a supporting member for the vibrating member, said members having attaching parts at the ends of said vibrating member; and rubber cushioning means disposed between the attaching parts and secured with relation to one member at least by bonding, the rubber being so disposed between the parts that the major portion of the torque thrust taken by the rubber at each end of the member is taken by rubber accommodating the torque movement in shear, and the gravity thrust at one end of the vibrating member is accommodated by a different stress of the rubber than that which takes the torque thrust in shear.

14. The combination of means mounting a member having rotating parts subjecting the member to torque-induced vibrations; a supporting member for the vibrating member, said members having attaching parts at the ends of said vibrating member; and rubber cushioning means disposed between the attaching parts, the rubber being so disposed between the parts that the major portion of the thrust taken by the rubber is taken by rubber accommodating the torque movement in shear, the attaching parts at one end comprising means for connection to the vibrating member and to the supporting member, said means having an axis extending in the direction of the axis of the rotating part, the rubber being disposed between the means and bonded to at least one of the parts.

15. The combination of means mounting a member having rotating parts subjecting the member to torque-induced vibrations; a supporting member for the vibrating member, said members having attaching parts at the ends of said vibrating member; and rubber cushioning means disposed between the attaching parts, the rubber being so disposed between the parts that the major portion of the thrust taken by the rubber is taken by rubber accommodating the torque movement in shear, the rubber cushioning means at one end of the member having an annular part and a part arranged within the annular part and rubber therebetween, one of said parts being attached to the vibrating member and the other to the supporting member, said parts having an axis extending in the direction of the axis of the rotating part and the rubber disposed between the parts being bonded to at least one of the parts.

16. The combination of means mounting a member having rotating parts subjecting the member to torque-induced vibrations; a supporting member for the vibrating member, said members having attaching parts at the ends of said vibrating member; and rubber cushioning means disposed between the attaching parts, the rubber being so disposed between the parts that the major portion of the thrust taken by the rubber is taken by rubber accommodating the torque movement in shear, the attaching parts at one end of the member comprising means for connection to the vibrating member and the supporting member, said means having an axis extending in the direction of the axis of the rotating part, the rubber being disposed between the means and bonded to at least one of the parts, and the rubber cushioning means at the opposite end of the engine carrying the major portion of the gravity thrust in shear.

17. In an automobile engine mounting, the combination of an automobile frame; and engine; and mountings forming the only supporting connection between the engine and the frame, each of said mountings including an outer annular member, and an inner member within the annular member and rubber disposed therebetween and secured by vulcanization, at least some of said members being arranged vertically and having the rubber secured to the inner and outer members and at least one of said members being arranged horizontally with its axis lengthwise of the engine.

18. In an automobile engine mounting, the combination of an automobile frame; an engine; and mountings forming the only supporting connection between the engine and the frame, each of said mountings including an outer annular member, and an inner member within the annular member and rubber therebetween, at least some of said members being arranged vertically and having the rubber secured to the outer and inner members by vulcanization and at least one of said members being arranged horizontally with its axis lengthwise of the engine, the last-mentioned mounting having the rubber united with at least one of its members by vulcanization.

19. In an automobile engine mounting, the combination of a frame, an engine, and mountings for the engine having means for connecting the engine to the chassis at each end of the engine, rubber cushioning means connected to the attaching means, the rubber between said attaching means being so arranged and disposed between the engine and the chassis that the major portion of the torque thrust taken by the rubber is taken by rubber accommodating the torque movement in shear.

In testimony whereof I have hereunto set my hand.

HUGH C. LORD.